US012604214B2

(12) United States Patent
Colom Ikuno et al.

(10) Patent No.: US 12,604,214 B2
(45) Date of Patent: Apr. 14, 2026

(54) METHODS FOR GENERATION AND TRANSMISSION OF SYSTEM INFORMATION, SI, IN A MOBILE TELECOMMUNICATION NETWORK, MN, AND MNS THEREOF

(71) Applicant: Deutsche Telekom AG, Bonn (DE)

(72) Inventors: Josep Colom Ikuno, Korneuburg (AT); Claudio Coletti, Prague (CZ)

(73) Assignee: Deutsche Telekom AG, Bonn (DE)

( * ) Notice: Subject to any disclaimer, the term of this patent is extended or adjusted under 35 U.S.C. 154(b) by 325 days.

(21) Appl. No.: 18/563,936

(22) PCT Filed: May 6, 2022

(86) PCT No.: PCT/EP2022/062289
§ 371 (c)(1),
(2) Date: Nov. 24, 2023

(87) PCT Pub. No.: WO2022/248193
PCT Pub. Date: Dec. 1, 2022

(65) Prior Publication Data
US 2024/0251259 A1 Jul. 25, 2024

(30) Foreign Application Priority Data

May 26, 2021 (EP) ..................................... 21175908

(51) Int. Cl.
*H04W 4/90* (2018.01)
*H04W 24/02* (2009.01)
(Continued)

(52) U.S. Cl.
CPC ........... *H04W 24/02* (2013.01); *H04W 48/18* (2013.01); *H04W 80/12* (2013.01)

(58) Field of Classification Search
None
See application file for complete search history.

(56) References Cited

U.S. PATENT DOCUMENTS

2018/0049107 A1    2/2018  Johansson et al.
2023/0147513 A1*   5/2023  Tamura ................. H04W 76/50
                                                    455/404.1

FOREIGN PATENT DOCUMENTS

EP              3331285 A1      6/2018
WO      WO 2020163764 A1      8/2020

OTHER PUBLICATIONS

"3rd Generation Partnership Project; Technical Specification Group Radio Access Network; NR; Radio Resource Control (RRC) protocol specification (Release 16)", 3GPP Draft; Draft 38331-G1 0_V5, 3rd Generation Partnership Project (3GPP), Mobile Competence Centre ; 650, Route Des Lucioles; F-06921, Sophia-Antipolis Cedex; France, Jul. 23, 2020 (Jul. 23, 2020), XP051909978, Retrieved from the Internet: URL:https://ftp.3gpp.org/tsg_ran/WG2_RL2/Specifications/202007draft_specs_after_RAN_88/Draft_38331-g1_0_v5.docx [retrieved on Jul. 23, 2020].

(Continued)

*Primary Examiner* — Gary Lafontant
(74) *Attorney, Agent, or Firm* — Leydig, Voit & Mayer, Ltd.

(57) ABSTRACT
A network includes a user equipment, and a Radio Access Network (RAN) composed of RAN nodes and includes RAN components. An infrastructure management entity generates system information elements (SI-IEs) relative to an infrastructure layer (I-SI-IEs), and inputs them to the RAN components. The RAN components generate SI composed of SI-IEs relative to the RAN, the SI-IE is relative to an application layer (A-SI-IE), and is either configured locally by the RAN components, or received from an operations and management system entity. An I-SI-IE inputted by an infrastructure management entity, and/or information derived from one or more A-SI-IEs and/or I-SI-IEs. The RAN components are configured to transmit the generated SI to radio units (RUs) via a fronthaul interface. The one or (Continued)

more RUs uses the information received from the RAN to generate and transmit a radio signal comprising the SI-IEs. The user equipment receives the radio signal transmitted by the RUs.

20 Claims, 5 Drawing Sheets

(51) Int. Cl.
*H04W 48/10* (2009.01)
*H04W 48/18* (2009.01)
*H04W 80/12* (2009.01)

(56) References Cited

OTHER PUBLICATIONS

Samsung, "The time reference information in split NG-RAN architecture", vol. RAN WG3, No. Reno, USA; May 13, 2019-May 17, 2019, May 13, 2019 (May 13, 2019), pp. 1-3, 3GPP Draft; R3-192661_ DISC_THE Time Reference Information, 3rd Generation Partnership Project (3GPP), Mobile Competence Centre; 650, Route Des Lucioles; F-06921 Sophia-Antipolis Cedex; France, XP051731933, Retrieved from the Internet: URL:http://www.4gpp.org/ftp/Meetings% 5F3GPP%5FSYNC/RAN3/Docs/R3%2O192661%2Ezip [retrieved on May 13, 2019].

Stefano Ruffini Telefon AB-LM Ericsson Sweden: "Proposals for GSTR-TN5G; C545", ITU-T Draft; Study Period 2017-2020; Study Group 15; Series C545, International Telecommunication Union, Geneva; CH, vol. 11/15, 12/15, 13/15; Jan. 16, 2018 (Jan. 16, 2018), pp. 1-5, XP044237402, Retrieved from the Internet: URL:https:// www.itu.int/ifa/t/2017/sg15/docs/c/ties/T17-SG15-C-0545IIMSW-E.docx [retrieved on Jan. 16, 2018].

* cited by examiner

Radio signal

METHODS FOR GENERATION AND TRANSMISSION OF SYSTEM INFORMATION, SI, IN A MOBILE TELECOMMUNICATION NETWORK, MN, AND MNS THEREOF

CROSS REFERENCE TO RELATED APPLICATIONS

This application is a U.S. National Phase application under 35 U.S.C. § 371 of International Application No. PCT/EP2022/062289, filed on May 6, 2022, and claims benefit to European Patent Application No. EP 21175908.9, filed on May 26, 2021. The International Application was published in English on Dec. 1, 2022 as WO 2022/248193 A1 under PCT Article 21(2).

FIELD OF THE INVENTION

This invention relates to methods for generation and transmission of System Information, SI, in a Mobile telecommunication Network, MN, and MNs thereof.

BACKGROUND

Open Radio Access Network (O-RAN) relates to a disaggregated approach to deploying Radio Access Networks (RANs) built on cloud native principles. O-RAN allows a disaggregation of the RAN layer of telecom networks to achieve a disaggregated system comprised of: Common Infrastructure layer; differentiated RAN software running on top of said O-RAN infrastructure; and standardized interfaces between components within the RAN.

The common Infrastructure layer (similar to what cloud providers provide to current software application) is where the RAN software can run on. In the foregoing specification the common Infrastructure layer is referred to as "Infrastructure layer".

Furthermore, the differentiated RAN software running on top of said O-RAN infrastructure (i.e. the application layer), will be referred to in the foregoing specification as "RAN software".

Currently, the infrastructure and application layers are completely decoupled. That is, from the application perspective, the underlying infrastructure is not in any way visible. Neither directly (typically not desirable) nor indirectly (e.g. whether certain services or features may be available).

There are several touchpoints between the application and infrastructure layer and the tighter both layers have to interwork, the more touchpoints that may be required. Examples of such touchpoints in current state of the art are whether the infrastructure provides specific hardware capabilities (e.g. accelerator modules) or the exact services a runtime environment provides (e.g. container, virtualization environment).

FIG. 1 illustrates an example of the functional split of current mobile telecommunications systems (exemplified for the case of a 5G system). In FIG. 1 there is shown that a UE 1 is connected to a Data Network (DN) 4 via a Core Network (CN) 3 and an Access Network (AN) 2, in this example a Radio Access Network (RAN)s.

In the following description of the invention, the ANs 2 are Radio Access Networks (RANs), which are ANs that are based on radio technologies (e.g. 5G New Radio, 5G NR).

Both the RAN 2 and the CN 3 are composed of several functional components. In the case of 5G, the RAN 2 is composed of gNBs and the CN 3 of Network Functions (NFs). The interface between the RAN 2 and the UE 1 is radio-based (in a 5GC, termed "Uu interface").

FIG. 2 illustrates an example of the RAN and CN decomposition. FIG. 2 also depicts the several relevant interfaces between the following components as named within a 5G system: gNB-gNB: Xn interface; UE-gNB: Uu interface; and gNB-NF: NG interface.

A current state of the art disaggregated RAN architecture is that defined by the O-RAN Alliance (Technical Specification: O-RAN Architecture Description; ORAN.WG1. O-RAN-Architecture-Description-v03.00). This architecture defines elements such as a cloud computing platform comprising a collection of physical infrastructure nodes that meet O-RAN requirements to host the relevant O-RAN functions (such as Near-RT RIC, O-CU-CP, O-CU-UP, and O-DU), supporting software components (such as Operating System, Virtual Machine Monitor, Container Runtime, etc.) and appropriate management and orchestration functions.

In parallel, the application layer follows a disaggregation trend, being the state of the art with 5G that a functional RAN node (gNB) is divided in two dimensions in CU/DU (central/distributed units) and CP/UP (control plane unit and user plane unit) (3GPP TS 38.401).

FIG. 3 illustrates the overall architecture for separation of gNB-CU-CP and gNB-CU-UP as illustrated in 3GPP TS 38.401, 6.1.2. The present invention, as described hereinafter, focuses on a disaggregated RAN, where the RAN is at least composed of a RU and a software component running on a computing platform.

Additionally, management components not part of the standardized functional components are typically part of gNB implementations and take care of, for example, management and/or Operation, Administration and Maintenance (OAM).

FIG. 4 illustrates a disaggregated RAN deployment according to an example. According to FIG. 4, the RAN software, which is depicted as application layer, is composed of one or more software components 21 and runs on the infrastructure layer, the infrastructure layer being composed of infrastructure nodes 22. Other applications, besides the RAN software, could run on the infrastructure layer.

From a deployment perspective, software components 21 connected to the RAN run, and can thus considered to be connected to physical infrastructure nodes, but from a functional perspective, the communication is with the RAN software (the RAN functional elements).

In the current state of the art, from the perspective of the UE (connected to the RAN via a Radio link), there is no difference where the gNB runs on. The infrastructure is not visible from its perspective.

Further, although not shown in FIG. 4, it is important to note that the service management and orchestration framework is part of the infrastructure layer, which is configured to manage the infrastructure nodes.

In order to obtain information from the RAN, the UE performs what is known as System Information (SI) acquisition (as defined by 3GPP TS 38.331). This entails the reception and processing of information broadcast be the RAN which aids the UE at characterizing the RAN system that it sees.

In a 5GS, the system information is divided in the Master Information Block (MIB) and System Information Block (SIB). FIG. 5 illustrates an exemplary functional view of the MIB and the SIB as defined by 3GPP TS 38.331. FIG. 6 illustrates a visual example of the broadcasting, from gNB to UE, of the System Information.

As illustrated in FIG. 5, the UE 1 receives System Information (SI) in the MIB and SIB1. Then, the UE 1 sends a request for system information to the network. Thereafter, the network sends to the UE 1 messages including the requested system information.

In this regard, both the MIB and SIB contain information elements of different granularity. Examples of such information elements that can be found in the System Information (SI) are: Frequency info for the uplink; Frequency band lists; Random Access Channel (RACH) parameters; PLMN IDs supported; whether specific services are supported (e.g. voice, UE onboarding, private networks); Access information (e.g. whether the cell is barred and whether only specific UEs may try to access the cell); service capabilities related to Core and/or IMS (e.g. VoNR support); etc.

In a 5GC, the UE uses the information received from the MIB and SIB, as well as other information and local configuration, as input for algorithms used in e.g. network selection, mobility and steering/triggering other radio procedures.

The common state-of-the-art principle is that the SI is sent via the so-called Broadcast Channel (BCH). In other words, the SI is broadcast using specific modulation and coding schemes that are not necessarily the same as those used for transmission of user data.

FIG. 7 illustrates an exemplary flowchart of the generation of the radio signal. According to FIG. 7, on a disaggregated RAN deployment, the RAN software component 21 generates the SI (as well as most data to generate the radio signal) and sends it via a fronthaul interface towards the Radio Unit (RU). The RU 23 is not relevant for generating the data itself but mainly performs only physical (PHY) layer functions.

Currently all of the parameters transmitted/broadcasted by a gNB within the BCH are 5GS-related parameters. There is currently no cross-layer information referring to the infrastructure layer in the broadcast information.

When deployed on O-RAN infrastructure, it is the RAN software that generates the signal being ultimately transmitted by the Radio Unit.

The above-described state of the art may be summarized as follows: the RAN is composed of RU, "functional rest" (RAN software) and a fronthaul interface between the two; the UE receives System Information (SIB/MIB) from the RAN. This information characterizes the RAN and 5G system behind it and is used by the UE for procedures such as network/cell selection and mobility; and the RAN software runs on an infrastructure layer.

Technical Problem

According to the state of the art, as described above, information related to the underlying infrastructure running the RAN cannot be considered by the UE, because the UE is not made aware of any infrastructure-related information elements.

Furthermore, a disaggregated RAN deployment allows operational disaggregation, i.e. operational separation between the RAN infrastructure and application layers.

On a disaggregated system, the following may require knowledge of the underlying infrastructure layer by the UE:

For a given RAN deployment (e.g. PLMN ID), prioritization or restriction of certain infrastructure nodes based on e.g. infrastructure operator, node capability or node load.

Regulatory requirement requiring disclosure of infrastructure information on the SI IEs.

Advertisement of services offered by the RAN infrastructure layer (e.g. low-latency services).

SUMMARY OF THE INVENTION

In an embodiment, the present disclosure provides a Mobile telecommunication Network (MN) comprising a User Equipment (UE) and a Radio Access Network (RAN), the RAN being composed of one or more RAN nodes, wherein the RAN comprises: an application layer comprising one or more RAN software components configured to run on one or more infrastructure nodes; an infrastructure layer comprising one or more Radio Units (RUs) and infrastructure nodes; an infrastructure management entity configured to manage the infrastructure nodes and/or the one or more RUs; a fronthaul interface configured to provide a data connection between the one or more RAN software components and the one or more RUs; and a radio interface configured to provide a data connection between the one or more RUs and the UE, wherein: the infrastructure management entity is configured to generate System Information (SI) elements (SI IEs) relative to the infrastructure layer (I-SI IEs), and input the I-SI IEs to the one or more RAN software components; the one or more RAN software components are configured to generate SI composed of SI IEs relative to the RAN, where the SI IE is: an SI IE relative to the application layer (A-SI IE), wherein the A-SI IE is either: configured locally by the one or more RAN software components itself, and/or received, by the one or more RAN software components, from an Operations and Management System, OAM, entity; an I-SI IE inputted by the infrastructure management entity; and/or information derived from one or more A-SI IEs and/or one or more I-SI IEs; the one or more RAN software components are configured to transmit the generated SI or information derived from the generated SI to the one or more RUs via the fronthaul interface; the one or more RUs is configured to use the information received from the RAN software to generate and transmit a radio signal comprising the SI IEs; and the UE is configured to receive the radio signal transmitted by the one or more RUs.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
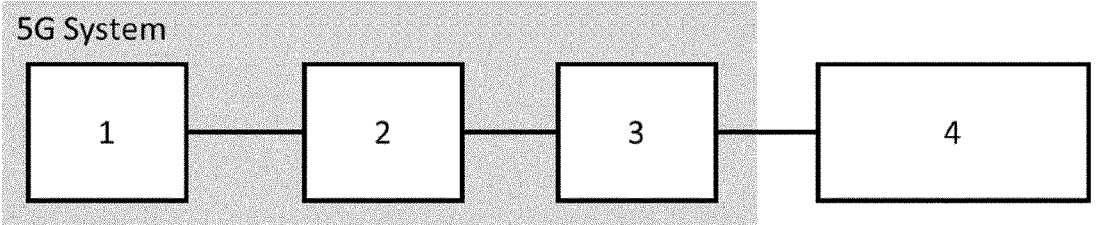
FIG. 1 illustrates an example of the functional split of current mobile telecommunications systems exemplified for the case of a 5G system.
Figure 2:
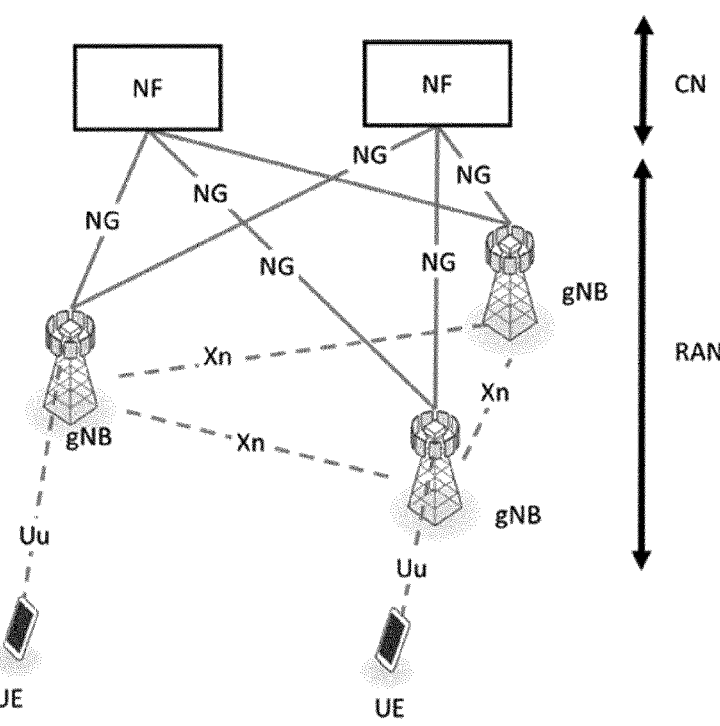
FIG. 2 illustrates an example of the RAN and CN decomposition.
Figure 3:
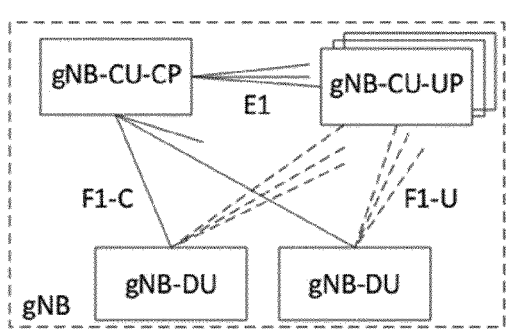
FIG. 3 illustrates the overall architecture for separation of gNB-CU-CP and gNB-CU-UP as illustrated in 3GPP TS 38.401, 6.1.2.

In view of the above, the present invention provides a mobile telecommunication network and a method for generation and transmission of System Information, SI, in a Mobile telecommunication Network, MN, and MNs thereof, where the UE is aware of the underlying infrastructure running the RAN.

According to an aspect of the invention, there is provided a Mobile telecommunication Network, MN, comprising a User Equipment, UE, and a Radio Access Network, RAN, the RAN being composed of one or more RAN nodes. The RAN comprises at least: an application layer comprising one or more RAN software components configured to run on one or more infrastructure nodes; an infrastructure layer comprising: one or more Radio Units, RUs, and infrastructure nodes; an infrastructure management entity configured to manage the infrastructure nodes and/or the one or more RUs; a fronthaul interface configured to provide a data connection between the one or more RAN software components and the one or more RUs; a radio interface configured to provide a data connection between the one or more RUs and the UE. The infrastructure management entity is configured to: generate System Information, SI, elements, SI IEs, relative to the infrastructure layer, I-SI IEs, and input the I-SI IEs to the one or more RAN software components. The one or more RAN software component is configured to generate SI composed of SI IEs relative to the RAN, where a SI IE is: a SI IE relative to the application layer, A-SI IE, wherein a A-SI IE is either: configured locally by the one or more RAN software components itself, and/or received, by the one or more RAN software components, from an Operations and Management System, OAM, entity; a I-SI IE inputted by the infrastructure management entity; and/or information derived from one or more A-SI IEs and/or one or more I-SI IEs. The one or more RAN software component is configured to transmit the generated SI or information derived from the generated SI to the one or more RUs via the fronthaul interface. The one or more RUs is configured to use the information received from the RAN software to generate and transmit a radio signal comprising the SI IEs. The UE is configured to receive the radio signal transmitted by the one or more RUs.

According to another aspect of the invention, there is provided a Mobile telecommunication Network, MN, comprising a User Equipment, UE, and a Radio Access Network, RAN, the RAN being composed of one or more RAN nodes. The RAN comprises at least: an application layer comprising one or more RAN software components configured to run on one or more infrastructure nodes; an infrastructure layer comprising: one or more Radio Units, RUs; and infrastructure nodes; an infrastructure management entity configured to manage the infrastructure nodes and/or the one or more RUs; a fronthaul interface configured to provide a data connection between the one or more RAN software components and the one or more RUs; a radio interface configured to provide a data connection between the one or more RUs and the UE. The one or more RAN software components is configured to: generate System Information, SI, composed of SI information elements, SI IEs, comprising information relative to the application layer, A-SI, wherein the A-SI is either: configured locally by the one or more RAN software components itself and/or received, by the one or more RAN software components, from an Operations and Management System, OAM, entity; and transmit the generated SI or information derived from the generated SI to the one or more RUs via the fronthaul interface. The infrastructure management entity is configured to: generate information elements, IEs, relative to the infrastructure layer, I-SI IEs, and input the I-SI IEs to the one or more RUs. The one or more RUs are configured to generate and transmit a radio signal containing SI IEs composed of: the I-SI IEs; and/or the A-SI IES; and/or information derived from one or more A-SI IEs and/or one or more I-SI IEs. The UE is configured to receive the radio signal transmitted by the one or more RUs.

According to a preferred aspect of the invention, the I-SI may comprise: information identifying an entity operating the infrastructure layer; and/or information relative to services being served by the infrastructure layer; and/or information relative to infrastructure load; and/or information relative to a nature of the software of the infrastructure layer; and/or information relative to a software version of the infrastructure layer; and/or information relative to connectivity of the infrastructure layer; and/or information relative to hardware capabilities of the infrastructure layer; and/or information relative to the availability of the infrastructure layer or infrastructure nodes.

According to a preferred aspect of the invention, the UE may be configured to use the I-SI to: perform network selection, mobility, trigger specific services or trigger specific procedures within specific services.

According to a preferred aspect of the invention, the I-SI may comprise one or more IEs referring to information from multiple infrastructure layers.

According to a preferred aspect of the invention, the one or more RAN nodes may be configured to exchange I-SI information for steering UE mobility.

According to another aspect of the invention, there is provided a method for generation and transmission of System Information, SI, in a Mobile telecommunication Network, MN, comprising a User Equipment, UE, and a Radio Access Network, RAN, the RAN being composed of one or more RAN nodes, wherein the RAN comprises at least: an application layer comprising one or more RAN software components running on one or more infrastructure nodes; an infrastructure layer comprising one or more Radio Units, RUs, and infrastructure nodes; an infrastructure management entity managing the infrastructure nodes and/or the one or more RUs; a fronthaul interface providing a data connection between the one or more RAN software components and the one or more RUs; a radio interface providing a data connection between the one or more RUs and the UE. The method comprising the steps of: generating, by the infrastructure management entity, System Information, SI, Elements, SI IEs, relative to the infrastructure layer, I-SI IEs, and inputting the I-SI IEs to the one or more RAN software components; generating, by the one or more RAN software components, SI composed of SI IEs relative to the RAN, where a SI IE is: a SI IE relative to the application layer, A-SI IE, wherein a A-SI IE is either: configured locally by the one or more RAN software components itself, and/or received, by the one or more RAN software components, from an Operations and Management System, OAM, entity; a I-SI IE inputted by the infrastructure management entity; and/or information derived from one or more A-SI IEs and/or one or more I-SI IEs; transmitting, by the one or more RAN software components, the generated SI or information derived from the generated SI to the one or more RUs via the fronthaul interface; generating and transmitting, by the one or more RUs, a radio signal comprising the SI IEs by using the information received from the RAN software; receiving, by the UE, the radio signal transmitted by the one or more RUs.

According to another aspect of the invention, there is provided a method for generation and transmission of System Information, SI, in a Mobile telecommunication Network, MN, comprising a User Equipment, UE, and a Radio Access Network, RAN, the RAN being composed of one or more RAN nodes, wherein the RAN comprises at least: an application layer comprising one or more RAN software components running on one or more infrastructure nodes; an infrastructure layer comprising one or more Radio Units, RUs, and infrastructure nodes; an infrastructure management entity managing the infrastructure nodes and/or the one or more RUs; a fronthaul interface providing a data connection between the one or more RAN software components and the one or more RUs; a radio interface providing a data connection between the one or more RUs and the UE. The method comprising the steps of: generating, by the one or more RAN software components, System Information, SI, composed of SI information elements, SI IEs, comprising information relative to the application layer, A-SI, wherein generating the A-SI is done by: locally configuring the A-SI by the one or more RAN software components itself and/or receiving, by the one or more RAN software components, from an Operations and Management System, OAM, entity; transmitting, by the one or more RAN software components, the generated SI or information derived from the generated SI to the one or more RUs via the fronthaul interface; generating, by the infrastructure management entity, SI information elements, IEs, relative to the infrastructure layer, I-SI IEs, and inputting the I-SI IEs to the one or more RUs; generating, by the one or more RUs, a radio signal comprising the SI; transmitting, by one or more RUs, the radio signal containing SI IEs composed of, the I-SI IEs; and/or the A-SI IES; and/or information derived from one or more A-SI IEs and/or one or more I-SI IEs; and receiving, by the UE, thee radio signal transmitted by the one or more RUs.

According to a preferred aspect of the invention, the I-SI may comprise: information identifying an entity operating the infrastructure layer; and/or information relative to services being served by the infrastructure layer; and/or information relative to infrastructure load; and/or information relative to a nature of the software of the infrastructure layer; and/or information relative to a software version of the infrastructure layer; and/or information relative to connectivity of the infrastructure layer; and/or information relative to hardware capabilities of the infrastructure layer.

According to a preferred aspect of the invention, the method further comprises performing, by the UE network selection or mobility using the I-SI; and/or triggering, by the UE, specific services or procedures within specific services using the I-SI.

According to a preferred aspect of the invention, the I-SI may comprise one or more IEs referring to information from multiple infrastructure layers.

According to a preferred aspect of the invention, the method may further comprise exchanging, by the one or more RAN nodes, I-SI information for steering UE mobility.

Other aspects, features, and advantages will be apparent from the summary above, as well as from the description that follows, including the figures and the claims.

DETAILED DESCRIPTION OF THE INVENTION

Figure 4:
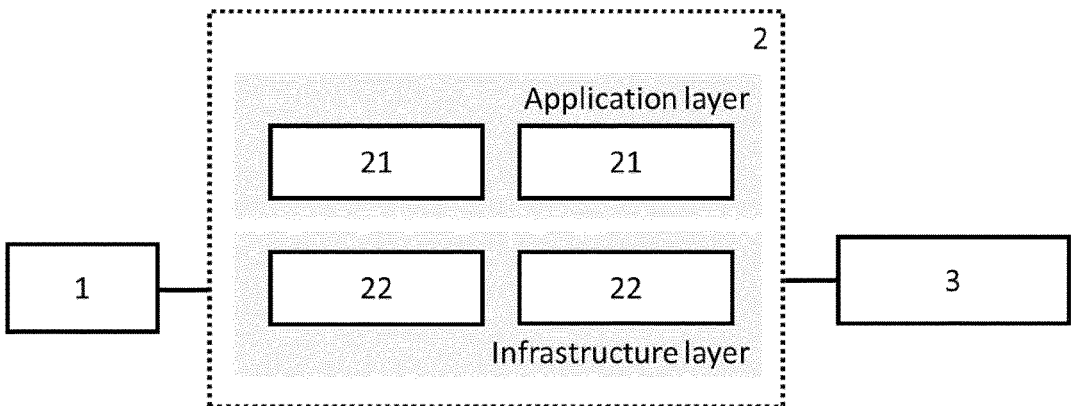
FIG. 4 illustrates a disaggregated RAN deployment according to an example.

The present invention comprises a Mobile telecommunication Network, MN, comprising a User Equipment (UE) 1, a Radio Access Network (RAN) 2, and a Core Network (CN) 3 as depicted in FIG. 4.

Figure 5:
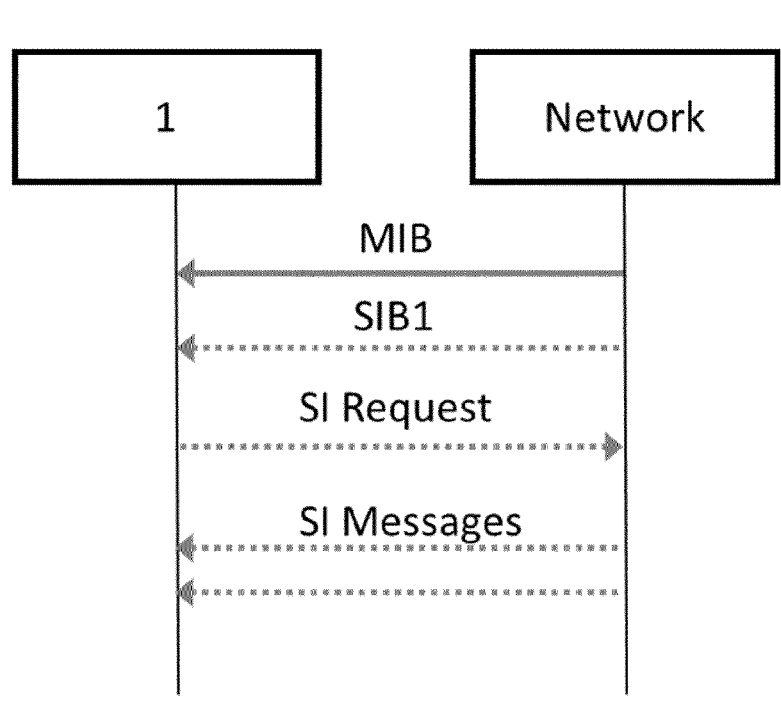
FIG. 5 illustrates an exemplary functional view of the MIB and the SIB as defined by 3GPP TS 38.331.
Figure 6:
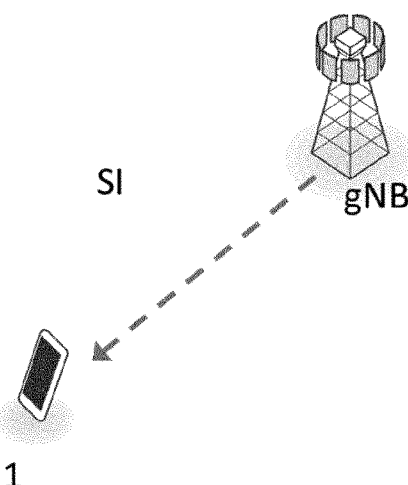
FIG. 6 illustrates a visual example of the broadcasting, from gNB to UE, of the System Information.
Figure 7:
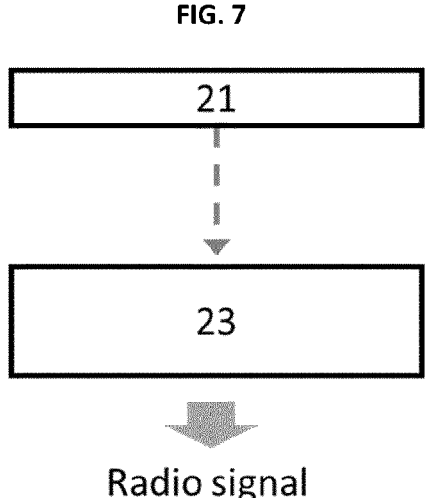
FIG. 7 illustrates an exemplary flowchart of the generation of the radio signal.

The RAN is composed of one or more RAN nodes (FIG. 5 only shows one RAN node). The RAN (or RAN nodes) comprises at least: an application layer comprising one or more RAN software components 21 configured to run on one or more infrastructure nodes 22; an infrastructure layer comprising: one or more Radio Units (RUs)(not shown) and the one or more infrastructure nodes 22; an infrastructure management entity (not shown) configured to manage the infrastructure nodes 22 and/or the one or more RUs; a fronthaul interface (not shown) configured to provide a data connection between the one or more RAN software components 21 and the one or more RUs; and a radio interface configured to provide a data connection between the one or more RUs and the UE 1.

According to the present invention, additional System Information (SI) elements (SI IEs) related to the infrastructure layer (I-IEs) are also transmitted by the RAN and received by the UE. Consequently, the SI is defined so as to be composed of: Application layer related SI (A-SI) information elements and Infrastructure layer related SI (I-SI) information elements.

Figure 8:
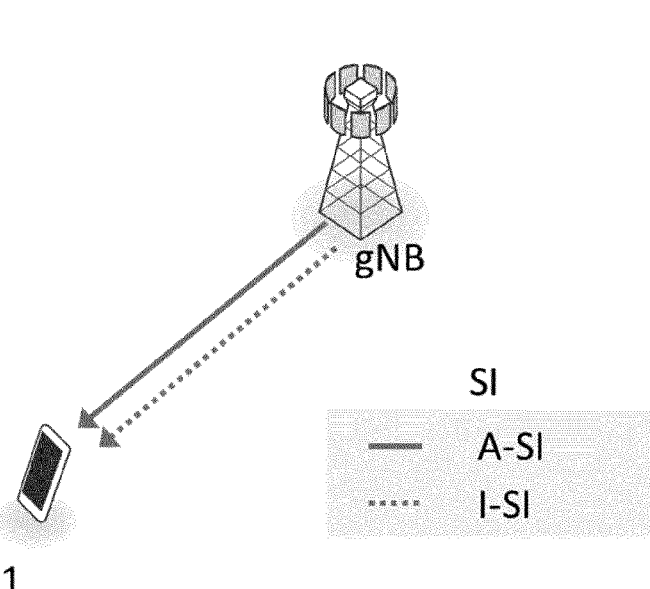
FIG. 8 illustrates a SI received by a UE containing 5GS-SI and O-RAN SI according to an embodiment of the present invention.

This is illustrated in FIG. 8, where a UE receives SI containing 5GS-SI and O-RAN SI from the gNB. Here, the System Information (SI) comprises Application layer related SI (A-SI) information elements and Infrastructure layer related SI (I-SI) information elements.

Example information elements that can be included as part of the I-SI are:

Identifier (similar to a PLMN ID) identifying infrastructure layer operators. In such a case, this information can be used for cell selection (for example, preference of some infrastructure operator to others based on, for example, cost);

Availability of certain infrastructure-dependent services on a given cell;

Application (e.g. computing, AR) services offered by the infrastructure layer that may experience different load on different infrastructure nodes. By exposing such information, the UE can be able to use said information for, for example, network selection, mobility, trigger specific services or trigger specific procedures within specific services.

Figure 9:
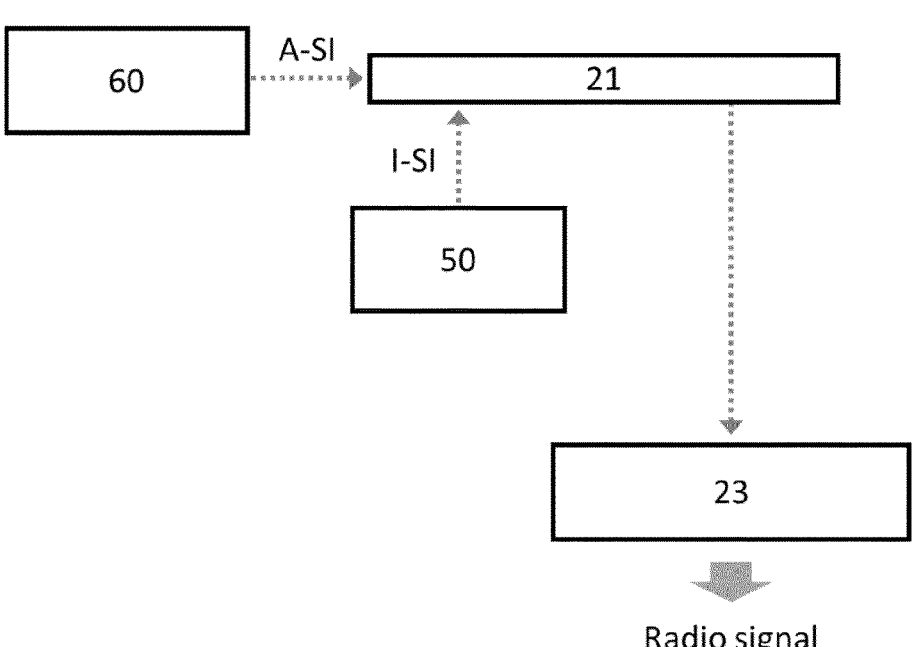
FIG. 9 illustrates a flowchart of the generation of the SI by the application layer according to an embodiment of the present invention.
Figure 10:
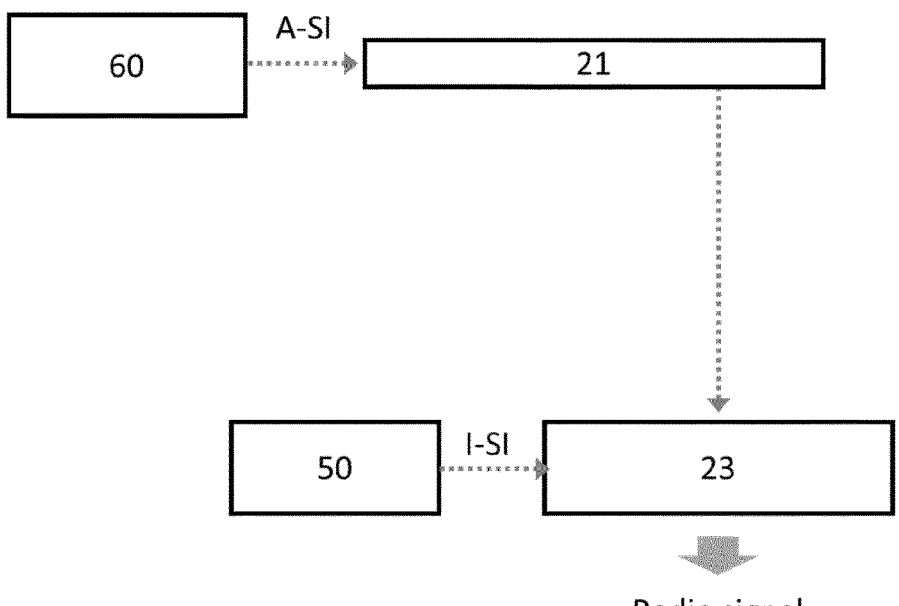
FIG. 10 illustrates a flowchart of the generation of the SI by the infrastructure layer according to an embodiment of the present invention.

The generation of the system information (SI) may be done by two different alternatives as illustrated by FIGS. 9 and 10. In FIG. 9, the application layer generates the SI, whereas in FIG. 10, the infrastructure layer generates the SI.

According to the alternative illustrated by FIG. 9, an infrastructure layer management entity 50 is configured to generate SI elements (SI IEs) relative to the infrastructure layer (I-SI IEs). Once generated, the infrastructure layer management entity 50 inputs the I-SI IEs to the one or more RAN software components 21.

Based on the above received inputs, the one or more RAN software components 21 generate SI composed of SI IEs relative to the RAN.

A SI IE may be a SI IE relative to the application layer, A-SI IE. In that case, a A-SI IE can be either: configured locally by the one or more RAN software components 21 itself. Besides, a A-SI IE may be received, by the one or more RAN software components 21, from an Operations and Management System, OAM, entity 60. Furthermore, a SI IE can be a I-SI IE as inputted by the infrastructure layer management entity 50. In addition, a SI IE, instead of being a I-SI IE or A-SI IE, may be information derived from one or more A-SI IEs and/or one or more I-SI IEs.

The one or more RAN software components 21 transmit the generated SI or information derived from the generated SI to the one or more RUs 23 via the fronthaul interface.

Based on the information received from the RAN software components 21, the one or more RUs 23 generate and transmit a radio signal comprising the SI IEs.

Finally, the UE 1 receives the radio signal transmitted by the one or more RUs 23.

In O-RAN terminology, the Infrastructure layer Management entity 50 may be the Service Management and Orchestration Framework and the fronthaul interface may be the O-FH. The Infrastructure layer Management entity 50 may be connected to the one or more RUs through a new interface touchpoint between the O-RAN layer and the application layer.

Alternatively, the SI may be generated by the application layer as illustrated by FIG. 11.

In this case, the one or more RAN software components 21 generate the SI composed of SI IEs. The SI IEs comprise information relative to the application layer (A-SI) which can be either: configured locally by the one or more RAN software components 21 itself and/or received from an Operations and Management System, OAM, entity 60.

Thereafter, the one or more RAN software components 21 transmit the generated SI or information derived from the generated SI to the one or more RUs 23 via the fronthaul interface.

By contrast to the embodiment of FIG. 9, in FIG. 10 the infrastructure layer management entity 50 generates the IEs relative to the infrastructure layer (I-SI IEs) and inputs them to the one or more RUs 23.

Then, the one or more RUs 23 generate and transmit a radio signal. The radio signal contains SI IEs composed of: the I-SI IEs; and/or the A-SI IES; and/or information derived from one or more A-SI IEs and/or one or more I-SI IEs.

Lastly the UE 1 receives the radio signal transmitted by the one or more RUs.

According to both described alternatives, the Infrastructure layer is also characterized by System Information (SI). Advantageously, the UE 1 receives SI not only referring to the RAN but also to the infrastructure layer.

Optionally, the Infrastructure layer related SI elements (I-SI) may comprise: information identifying an entity operating the infrastructure layer (for example, O-RAN infrastructure operator); and/or information relative to services being served by the infrastructure layer (for example, specific forms of edge computing, traffic offloading); and/or information relative to infrastructure load; and/or information relative to a nature of the software of the infrastructure layer; and/or information relative to a software version of the infrastructure layer; and/or information relative to connectivity of the infrastructure layer; and/or information relative to hardware capabilities of the infrastructure layer; and/or information relative to the availability of the infrastructure layer or infrastructure nodes.

Optionally, the I-SI may further be used by the UE to perform network selection (for example, to indicate preference of specific O-RAN providers to others), mobility (for example, infrastructure load), trigger specific services or trigger specific procedures within specific services.

Optionally, the I-SI may comprise one or more IEs referring to information from multiple infrastructure layers (for example, RU and DU from different infrastructure operators).

Optionally, the one or more RAN nodes are configured to exchange I-SI information for steering UE mobility (for example, decide target RAN node for UE mobility/handover).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfill the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A Mobile telecommunication Network (MN) comprising a User Equipment (UE) and a Radio Access Network (RAN), the RAN being composed of one or more RAN nodes, wherein the RAN comprises:

an application layer comprising one or more RAN software components configured to run on one or more infrastructure nodes;

an infrastructure layer comprising one or more Radio Units (RUs) and infrastructure nodes;

an infrastructure management entity configured to manage the infrastructure nodes and/or the one or more RUs;

a fronthaul interface configured to provide a data connection between the one or more RAN software components and the one or more RUs; and a radio interface configured to provide a data connection between the one or more RUs and the UE, wherein:

the infrastructure management entity is configured to generate System Information (SI) elements (SI IEs) relative to the infrastructure layer (I-SI IEs), and input the I-SI IEs to the one or more RAN software components;

the one or more RAN software components are configured to generate SI composed of SI IEs relative to the RAN, where the SI IE is:

an SI IE relative to the application layer (A-SI IE), wherein the A-SI IE is either: configured locally by the one or more RAN software components itself; and/or received, by the one or more RAN software components, from an Operations and Management System, OAM, entity;

an I-SI IE inputted by the infrastructure management entity; and/or information derived from one or more A-SI IEs and/or one or more I-SI IEs;

the one or more RAN software components are configured to transmit the generated SI or information derived from the generated SI to the one or more RUs via the fronthaul interface;

the one or more RUs is configured to use the information received from the RAN software to generate and transmit a radio signal comprising the SI IEs; and the UE is configured to receive the radio signal transmitted by the one or more RUs.

2. The mobile telecommunication network of claim 1, wherein the I-SI comprises:

information identifying an entity operating the infrastructure layer; and/or information relative to services being served by the infrastructure layer; and/or information relative to infrastructure load; and/or information relative to a nature of the software of the infrastructure layer; and/or information relative to a software version of the infrastructure layer; and/or information relative to connectivity of the infrastructure layer; and/or information relative to hardware capabilities of the infrastructure layer; and/or information relative to the availability of the infrastructure layer or infrastructure nodes.

3. The mobile telecommunication network of claim 1, wherein:

the UE is configured to use the I-SI to perform network selection, mobility, trigger specific services or trigger specific procedures within specific services.

4. The mobile telecommunication network of claim 1, wherein the I-SI comprise one or more IEs referring to information from multiple infrastructure layers.

5. The mobile telecommunication network of claim 1, wherein the one or more RAN nodes are configured to exchange I-SI information for steering UE mobility.

6. A Mobile telecommunication Network (MN) comprising a User Equipment (UE) and a Radio Access Network (RAN), the RAN being composed of one or more RAN nodes, wherein the RAN comprises:

an application layer comprising one or more RAN software components configured to run on one or more infrastructure nodes; an infrastructure layer comprising: one or more Radio Units (RUs); and infrastructure nodes; an infrastructure management entity configured to manage the infrastructure nodes and/or the one or more RUs; a fronthaul interface configured to provide a data connection between the one or more RAN software components and the one or more RUs; and a radio interface configured to provide a data connection between the one or more RUs and the UE, wherein:

the one or more RAN software components are configured to: generate System Information (SI) composed of SI information elements (SI IEs), comprising information relative to the application layer (A-SI), wherein the A-SI is either: configured locally by the one or more RAN software components itself and/or received, by the one or more RAN software components, from an Operations and Management System (OAM) entity; and transmit the generated SI or information derived from the generated SI to the one or more RUs via the fronthaul interface;

the infrastructure management entity is configured to: generate information elements (IEs) relative to the infrastructure layer (I-SI IEs) and input the I-SI IEs to the one or more RUs;

the one or more RUs are configured to generate and transmit a radio signal containing SI IEs composed of: the I-SI IEs; and/or the A-SI IES; and/or information derived from one or more A-SI IEs and/or one or more I-SI IEs; and the UE is configured to receive the radio signal transmitted by the one or more RUs.

7. The mobile telecommunication network of claim 6, wherein the I-SI comprises:

information identifying an entity operating the infrastructure layer; and/or information relative to services being served by the infrastructure layer; and/or information relative to infrastructure load; and/or information relative to a nature of the software of the infrastructure layer; and/or information relative to a software version of the infrastructure layer; and/or information relative to connectivity of the infrastructure layer; and/or information relative to hardware capabilities of the infrastructure layer; and/or information relative to the availability of the infrastructure layer or infrastructure nodes.

8. The mobile telecommunication network of claim 6, wherein:

the UE is configured to use the I-SI to perform network selection, mobility, trigger specific services or trigger specific procedures within specific services.

9. The mobile telecommunication network of claim 6, wherein the I-SI comprise one or more IEs referring to information from multiple infrastructure layers.

10. The mobile telecommunication network of claim 6, wherein the one or more RAN nodes are configured to exchange I-SI information for steering UE mobility.

11. A method for generation and transmission of System Information (SI) in a Mobile telecommunication Network (MN) comprising a User Equipment (UE), and a Radio Access Network (RAN), the RAN being composed of one or more RAN nodes, wherein the RAN comprises at least: an application layer comprising one or more RAN software components running on one or more infrastructure nodes; an infrastructure layer comprising one or more Radio Units (RUs), and infrastructure nodes; an infrastructure management entity managing the infrastructure nodes and/or the one or more RUs; a fronthaul interface providing a data connection between the one or more RAN software components and the one or more RUs; a radio interface providing a data connection between the one or more RUs and the UE, the method comprising the steps of:

generating, by the infrastructure management entity, System Information (SI) Elements (SI IEs), relative to the infrastructure layer (I-SI IEs), and inputting the I-SI IEs to the one or more RAN software components;

generating, by the one or more RAN software components, SI composed of SI IEs relative to the RAN, where an SI IE is:

an SI IE relative to the application layer (A-SI IE), wherein an A-SI IE is either: configured locally by the one or more RAN software components itself; and/or received, by the one or more RAN software components, from an Operations and Management System, OAM, entity;

an I-SI IE inputted by the infrastructure management entity; and/or information derived from one or more A-SI IEs and/or one or more I-SI IEs;

transmitting, by the one or more RAN software components, the generated SI or information derived from the generated SI to the one or more RUs via the fronthaul interface;

generating and transmitting, by the one or more RUs, a radio signal comprising the SI IEs by using the information received from the RAN software; and receiving, by the UE, the radio signal transmitted by the one or more RUs.

12. The method of claim 11, wherein the I-SI comprises:

information identifying an entity operating the infrastructure layer; and/or information relative to services being served by the infrastructure layer; and/or information relative to infrastructure load; and/or information relative to a nature of the software of the infrastructure layer; and/or information relative to a software version of the infrastructure layer; and/or information relative to connectivity of the infrastructure layer; and/or information relative to hardware capabilities of the infrastructure layer.

13. The method of claim 11, further comprising:

performing, by the UE network selection or mobility using the I-SI; and/or triggering, by the UE, specific services or procedures within specific services using the I-SI.

14. The method of claim 11, wherein the I-SI comprises one or more IEs referring to information from multiple infrastructure layers.

15. The method of claim 11, further comprising exchanging, by the one or more RAN nodes, I-SI information for steering UE mobility.

16. A method for generation and transmission of System Information (SI) in a Mobile telecommunication Network (MN) comprising a User Equipment (UE) and a Radio Access Network (RAN), the RAN being composed of one or more RAN nodes, wherein the RAN comprises at least: an application layer comprising one or more RAN software components running on one or more infrastructure nodes; an infrastructure layer comprising one or more Radio Units (RUs), and infrastructure nodes; an infrastructure management entity managing the infrastructure nodes and/or the one or more RUs; a fronthaul interface providing a data connection between the one or more RAN software components and the one or more RUs; a radio interface providing a data connection between the one or more RUs and the UE, the method comprising the steps of:

generating, by the one or more RAN software components, System Information (SI) composed of SI information elements (SI IEs), comprising information relative to the application layer (A-SI), wherein generating the A-SI is done by: locally configuring the A-SI by the one or more RAN software components itself and/or receiving, by the one or more RAN software components, from an Operations and Management System (OAM), entity;

transmitting, by the one or more RAN software components, the generated SI or information derived from the generated SI to the one or more RUs via the fronthaul interface;

generating, by the infrastructure management entity, SI information elements (IEs) relative to the infrastructure layer (I-SI IEs), and inputting the I-SI IEs to the one or more RUs;

generating, by the one or more RUs, a radio signal comprising the SI;

transmitting, by one or more RUs, the radio signal containing SI IEs composed of: the I-SI IEs; and/or the A-SI IES; and/or information derived from one or more A-SI IEs and/or one or more I-SI IEs; and receiving, by the UE, thee radio signal transmitted by the one or more RUs.

17. The method of claim 16, wherein the I-SI comprises:

information identifying an entity operating the infrastructure layer; and/or information relative to services being served by the infrastructure layer; and/or information relative to infrastructure load; and/or information relative to a nature of the software of the infrastructure layer; and/or information relative to a software version of the infrastructure layer; and/or information relative to connectivity of the infrastructure layer; and/or information relative to hardware capabilities of the infrastructure layer.

18. The method of claim 16, further comprising:

performing, by the UE network selection or mobility using the I-SI; and/or triggering, by the UE, specific services or procedures within specific services using the I-SI.

19. The method of claim 16, wherein the I-SI comprises one or more IEs referring to information from multiple infrastructure layers.

20. The method of claim 16, further comprising exchanging, by the one or more RAN nodes, I-SI information for steering UE mobility.

\* \* \* \* \*